United States Patent
Kyperountas et al.

(10) Patent No.: US 9,031,526 B2
(45) Date of Patent: May 12, 2015

(54) METHOD AND APPARATUS FOR IN-CHANNEL INTERFERENCE CANCELLATION

(75) Inventors: Spyros Kyperountas, Weston, FL (US); Neiyer S. Correal, Cooper City, FL (US); Qicai Shi, Coral Springs, FL (US); Charles L. Sobchak, Davie, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 47 days.

(21) Appl. No.: 13/527,006

(22) Filed: Jun. 19, 2012

(65) Prior Publication Data

US 2013/0337761 A1 Dec. 19, 2013

(51) Int. Cl.
*H04B 1/10* (2006.01)
*H04B 1/12* (2006.01)
*H04J 11/00* (2006.01)

(52) U.S. Cl.
CPC .. *H04B 1/10* (2013.01); *H04B 1/12* (2013.01); *H04B 1/1027* (2013.01); *H04J 11/0066* (2013.01)

(58) Field of Classification Search
CPC .... H04B 1/12; H04B 1/71055; H04B 1/1027; H04B 2001/1045
USPC .................................. 455/302–307
See application file for complete search history.

(56) References Cited

U.S. PATENT DOCUMENTS

| 3,988,679 A | 10/1976 | Clarke et al. |
| 7,411,897 B2 | 8/2008 | Yoo et al. |
| 7,551,910 B2 | 6/2009 | Darabi |
| 2001/0050987 A1* | 12/2001 | Yeap et al. ............... 379/399.01 |
| 2003/0021367 A1 | 1/2003 | Smith |
| 2007/0082638 A1 | 4/2007 | Panfilov et al. |
| 2009/0086863 A1* | 4/2009 | Komninakis et al. ......... 375/346 |
| 2009/0086864 A1* | 4/2009 | Komninakis et al. ......... 375/346 |

(Continued)

FOREIGN PATENT DOCUMENTS

WO 2007019688 A1 2/2007

OTHER PUBLICATIONS

Sanguinetti, L., et al., "On the Performance of Cancellation Carrier-based schemes for Sidelobe Suppression in OFDM networks," IEEE, May 2008, pp. 1691-1696.

(Continued)

*Primary Examiner* — Christian Hannon
(74) *Attorney, Agent, or Firm* — Steven A. May

(57) ABSTRACT

A communication device includes a receiver that is capable of canceling in-channel interference. The receiver includes an antenna for receiving a wireless signal comprising in-channel components and an out-of-channel component, wherein the in-channel components comprise a desired component and an in-channel interference component. A first filter of the receiver filters the wireless signal by blocking at least a portion of the out-of-channel component to produce a first signal comprising the in-channel components, and at least a second filter of the receiver filters the wireless signal by blocking at least a portion of the in-channel components to produce a second signal comprising the out-of-channel component. An in-channel interference estimator of the receiver generates an in-channel interference estimation signal based on the second signal. And a combiner of the filter combines the first signal and the second signal to at least partially cancel the in-channel interference component of the first signal.

18 Claims, 5 Drawing Sheets

(56) References Cited

U.S. PATENT DOCUMENTS

| | | | |
|---|---|---|---|
| 2009/0122854 | A1 | 5/2009 | Zhu et al. |
| 2010/0054115 | A1 | 3/2010 | Roh et al. |
| 2010/0322287 | A1 | 12/2010 | Truong et al. |
| 2011/0065409 | A1* | 3/2011 | Kenington ............... 455/307 |
| 2012/0014416 | A1 | 1/2012 | Dabiri |

OTHER PUBLICATIONS

Counterpart International Application No. PCT/US2013/044240—International Search Report with Written Opinion, mailing date Oct. 15, 2013—10 pp.

"Wideband Air Interface Isotropic Orthogonal Transform Algorithm (IOTA) Physical Layer Specification Public Safety Wideband Data Standards Project—Digital Radio Technical Standards," Telecommunications Industry Association Document, TIA-902.BBAB, Mar. 2003, pp. 1-46.

Baldemair, R., "Suppression of Narrow Frequency Bands in Multicarrier Transmission Systems," Retrieved from www.eurasip.org/Proceedings/Eusipco/Eusipco2000/.../CR1321.PDF on Jun. 12, 2014, pp. 1-4.

Brandes, S. et al., "Reduction of Out-of-Band Radiation in OFDM Based Overlay Systems," First IEEE International Symposium on New Frontiers in Dynamic Spectrum Access Networks, 2005, DySPAN 2005, Nov. 8-11, 2005, pp. 662-665.

Brandes, S. et al., "Sidelobe Suppression in OFDM Systems by Insertion of Cancellation Carriers," Vehicular Technology Conference, 2005. VTC-2005-Fall. 2005 IEEE 62nd, vol. 1, Sep. 28-25, 2005, pp. 152-156.

Panta, K.R. and Armstrong, J., "Spectral Analysis of OFDM signals and its Improvement by Polynomial Cancellation Coding," IEEE Transactions on Consumer Electronics, vol. 49, Issue 4, Nov. 2003, pp. 939-943.

Zhao, Y. and Haggman, S-G., "Intercarrier Interference Self-Cancellation Scheme for OFDM Mobile Communication Systems," IEEE Transactions on Communications, vol. 49, No. 7, Jul. 2001, pp. 1185-1191.

Zhao, Y., "In band and Out-band Spectrum Analysis of OFDM Communication Systems Using ICI Cancellation Methods," International Conference on Communication Technology Proceedings, 2000, WCC-ICCT 2000, vol. 1, pp. 773-776.

"An adaptive noise canceller for hearing aids using two nearby microphones", Jeff Vanden Berghe, vol. 103, No. 6, Jun. 1998.

"Interference Rejection in Digital Wireless Communications", J.D. Laster, J.H. Reed., IEEE Signal Processing Magazine, 1997.

"Interference Rejection Using Time-Dependent Constant Modulus Algorithm", R. Mendoza, J.H. Reed, T.C. Hsia, B.G. Agee, 1989.

"Interference Rejection Using Time-Dependent Constant Modulus Algorithm and the Hybrid CMA/Spectral Correlation Discriminator", R. Mendoza, J.H. Reed, T.C. Hsia, B.G. Agee, Transactions on Signal Processing, Sep. 1991.

\* cited by examiner

METHOD AND APPARATUS FOR IN-CHANNEL INTERFERENCE CANCELLATION

FIELD OF THE INVENTION

The present invention relates generally to wireless communication systems, and in particular to in-channel interference cancellation in a wireless communication system.

BACKGROUND OF THE INVENTION

When a broadband radio transmitter, such as a 700 MHz (Megahertz) Broadband Long Term Evolution (LTE) transmitter, is operating in the vicinity of a narrowband radio receiver, such as a Public Safety (PS) narrowband receiver, out-of-band emissions (OoBE) of the broadband transmitter may cause considerable interference to the narrowband PS receiver. The broadband transmitter's OoBE will sum with the noise of the receiver, resulting a decrease in a signal to interference-plus-noise ratio (SINR) at the narrowband PS receiver and thereby desensitize the receiver.

For example, FIG. 1 is an exemplary spectral graph 100 depicting a broadband signal 102 whose frequency band 108 is in close proximity to the frequency band 112 of a narrowband signal 106. Despite the inclusion of a guard band 110 as a buffer between the broadband signal and adjacent signals, such as narrowband signal 106, an OoBE 104 of broadband signal 102 still spills into the bandwidth of narrowband signal 106, resulting in receiver desensitization, that is, reduced Signal-to-Noise Ratio (SNR) 114 at a narrowband receiver.

For example, such receiver desensitization is known to occur in cases such as the C band, where the close proximity of the C block uplink (transmit) band to the Public Safety Narrowband (receive) band causes desensitization of a narrowband receiver when in close proximity to a C band uplink transmitter. More specifically, in the 700-800 MHz band, the 1 MHz guard band separating the C band uplink (776-787 MHz) from the adjacent Public Safety Narrowband (PSNB) (769-775 MHz) may fail to adequately protect PSNB transmissions from interference from a nearby C band transmitter. While interference in the PSNB by the C band uplink transmissions may be mitigated by improved filtering at a C band transmitter, improving such filtering can be difficult and expensive to implement and retrofitting transmitters that belong to non-public safety (third) parties or the public poses significant challenges.

Figure 1:
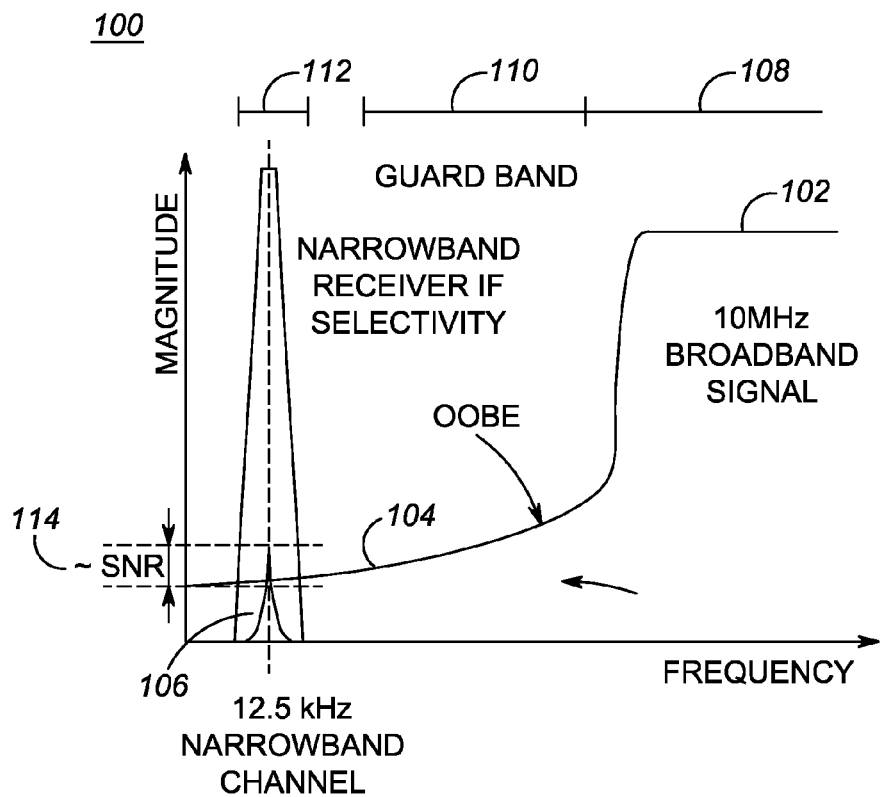
FIG. 1 is an exemplary spectral graph depicting a broadband signal whose frequency band is in close proximity to a frequency band of a narrowband signal.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DESCRIPTION OF A PREFERRED EMBODIMENT

To address the need for a mitigation of in-channel interference, a communication device is provided that includes a receiver that is capable of canceling in-channel interference. The receiver includes an antenna for receiving a wireless signal comprising in-channel components and an out-of-channel component, wherein the in-channel components comprise a desired component and an in-channel interference component. A first filter of the receiver filters the wireless signal by blocking at least a portion of the out-of-channel component to produce a first signal comprising the in-channel components, and at least a second filter of the receiver filters the wireless signal by blocking at least a portion of the in-channel components to produce a second signal comprising the out-of-channel component. An in-channel interference estimator of the receiver generates an in-channel interference estimation signal based on the second signal. And a combiner of the filter combines the first signal and the second signal to at least partially cancel the in-channel interference component of the first signal.

Generally, the present invention encompasses a method for canceling in-channel interference. The method includes receiving a wireless signal comprising in-channel components and an out-of-channel component, wherein the in-channel components comprise a desired component and an in-channel interference component, performing a first filtering of the wireless signal that blocks at least a portion of the out-of-channel component to produce a first signal comprising the in-channel components, performing a second filtering of the wireless signal that blocks at least a portion of the in-channel components to produce a second signal comprising the out-of-channel component, generating an in-channel interference estimation signal based on the second signal, and combining the first signal and the second signal to at least partially cancel the in-channel interference component of the first signal.

Another embodiment of the present invention provides a receiver that includes an antenna for receiving a wireless signal comprising in-channel components and an out-of-channel component, wherein the in-channel components comprise a desired component and an in-channel interference component, a first filter that filters the wireless signal by blocking at least a portion of the out-of-channel component to produce a first signal comprising the in-channel components, at least a second filter that filters the wireless signal by blocking at least a portion of the in-channel components to produce a second signal comprising the out-of-channel component, an in-channel interference estimator that generates an in-channel interference estimation signal based on the second signal, and a combiner that combines the first signal and the second signal to at least partially cancel the in-channel interference component of the first signal.

Figure 2:
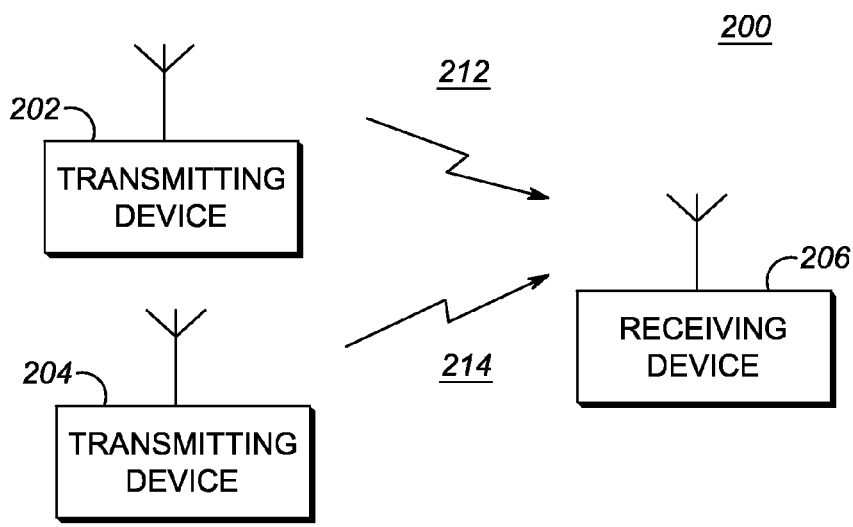
FIG. 2 is a block diagram of a wireless communication system in accordance with an embodiment of the present invention.

The present invention may be more fully described with reference to FIGS. 2-7. FIG. 2 is a block diagram of a wireless communication system 200 in accordance with an embodiment of the present invention. Communication system 200 includes multiple wireless transmitting communication devices 202, 204 (two shown) and a wireless receiving communication device 206 that is located in a coverage area of each of the transmitting communication devices. For example, each of transmitting communication devices 202, 204 may be a radio access network (RAN) access node such as a base station, a Node B, a Public Safety Base Station or an access point, or a User Equipment terminal, a UE, and receiving communication device 206 may be a user communication device such as a cellular telephone, a radiotelephone, a smartphone, or a personal digital assistant, laptop computer, tablet computer, or personal computer with wireless communication capabilities. However, in various embodiments of the present invention, one or more of transmitting communication devices 202 and 204 may be a user communication device and/or receiving communication device 206 may be a RAN access node. Each of transmitting communication device 202 and 204 transmits over a respective air interface 212, 214 that includes a forward link (not shown) and a reverse link (not shown).

Figure 3:
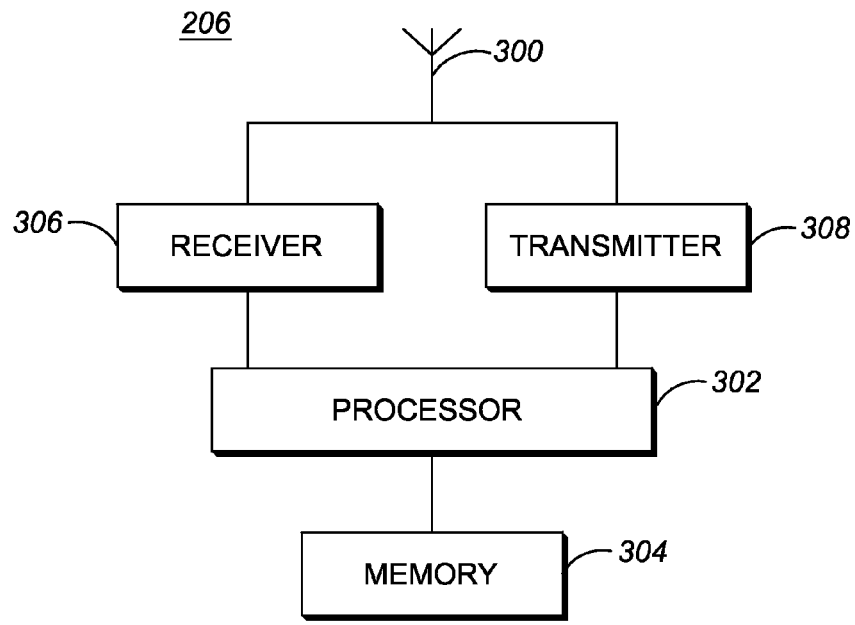
FIG. 3 is a block diagram of a wireless receiving communication device of FIG. 2 in accordance with various embodiments of the present invention.

FIG. 3 is a block diagram of receiving communication device 206 in accordance with various embodiments of the present invention. Receiving communication device 206 includes a processor 302, such as one or more microprocessors, microcontrollers, digital signal processors (DSPs), combinations thereof or such other devices known to those having ordinary skill in the art. Processor 302 is coupled to an at least one memory device 304, such as random access memory (RAM), dynamic random access memory (DRAM), and/or read only memory (ROM) or equivalents thereof, that maintains data and programs that may be executed by the processor and that allow the communication device to perform all functions necessary to operate in a wireless communication system. Communication device 206 further includes a receiver 306, and optionally may include a transmitter 308, that each are operationally coupled to processor 302 and to an antenna 300 and that provide for wirelessly receiving and transmitting messages by the communication device. Unless otherwise specified herein, all functions described as being performed herein by receiving communication device 206 is performed by processor 302.

Communication system 200 may be any type of wireless communication wherein different devices transmit signals at different frequencies, even if some transmitting devices share a frequency bandwidth. For example, communication system 200 may comprise one or more of a Frequency Division Multiple Access (FDMA) communication network, a Global System for Mobile communications (GSM) communication network, a Code Division Multiple Access (CDMA) communication network, any type of communication network that employs an Orthogonal Frequency Division Multiplexing (OFDM) modulation scheme, such as a 3GPP (Third Generation Partnership Project) E-UTRA (Evolutionary UMTS Terrestrial Radio Access) communication network, a 3GPP2 (Third Generation Partnership Project 2) Evolution communication network, for example, an Ultra Mobile Broadband (UMB) communication network, a Worldwide Interoperability for Microwave Access (WiMAX) communication network that operates in accordance with the IEEE (Institute of Electrical and Electronics Engineers) 802.16 standards, a Wireless Local Area Network (WLAN) communication system as described by the IEEE 802.xx standards, for example, the 802.11a/HiperLAN2, 802.11g, or 802.20 standards, or any of multiple proposed ultrawideband (UWB) communication networks.

The multiple transmitting communication devices 202, 204 may be operated by a same network operator and may be part of a same communication network, or one or more of the multiple transmitting communication devices 202, 204 may be operated by a different network operator and be part of a different communication network than another transmitting communication device of the multiple transmitting communication devices. For example, a first transmitting communication device 202 of the multiple transmitting communication devices 202, 204 may comprise a broadband transmitter, such as a 700 MHz (Megahertz) Broadband Long Term Evolution (LTE) transmitter, transmitting in the C band (776-787 MHz), while a second transmitting communication device 204 of the multiple transmitting communication devices 202, 204 may comprise a narrowband transmitter, such as a Public Safety (PS) narrowband transmitter, transmitting in the adjacent Public Safety Narrowband (PSNB) (769-775 MHz) and separated from the C band by a 1 MHz guard band.

When coverage areas 212 and 214 of transmitting communication devices 202 and 204 overlap, it is possible that a communication device, such as receiving communication device 206, located in the area of overlap and served by one of the multiple transmitting communication devices 202, 204, for example, by a first transmitting communication device 202, may receive transmissions from both serving transmitting communication device 202 and a second transmitting communication device 204. In such an instance, out-of-channel emissions, or out-of-band emissions (OoBE), related to transmissions by second transmitting communication device 204 may produce in-channel interference with respect to desired signals received from the first transmitting communication device 202. Such in-channel interference can desensitize receiver 306 of receiving communication device 206 and prevent the receiving communication device from correctly demodulating and decoding desired signals from first transmitting communication device 202. Therefore, communication system 200 minimizes the effect of such in-channel interference by providing for cancellation, by a receiving communication device, of in-channel interference generated by out-of-channel transmissions, thereby facilitating an ability of the receiving communication device to correctly demodulate and decode in-channel signals in the presence of such interference.

Figure 4:
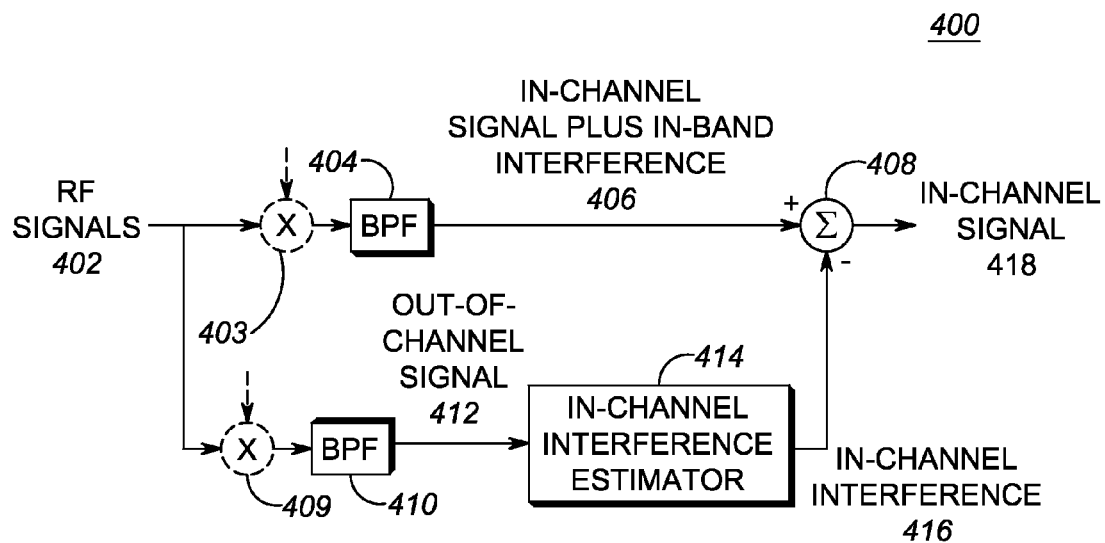
FIG. 4 depicts an architecture of a receiver of the wireless receiving communication device of FIG. 2 in accordance with various embodiments of the present invention.
Figure 5:
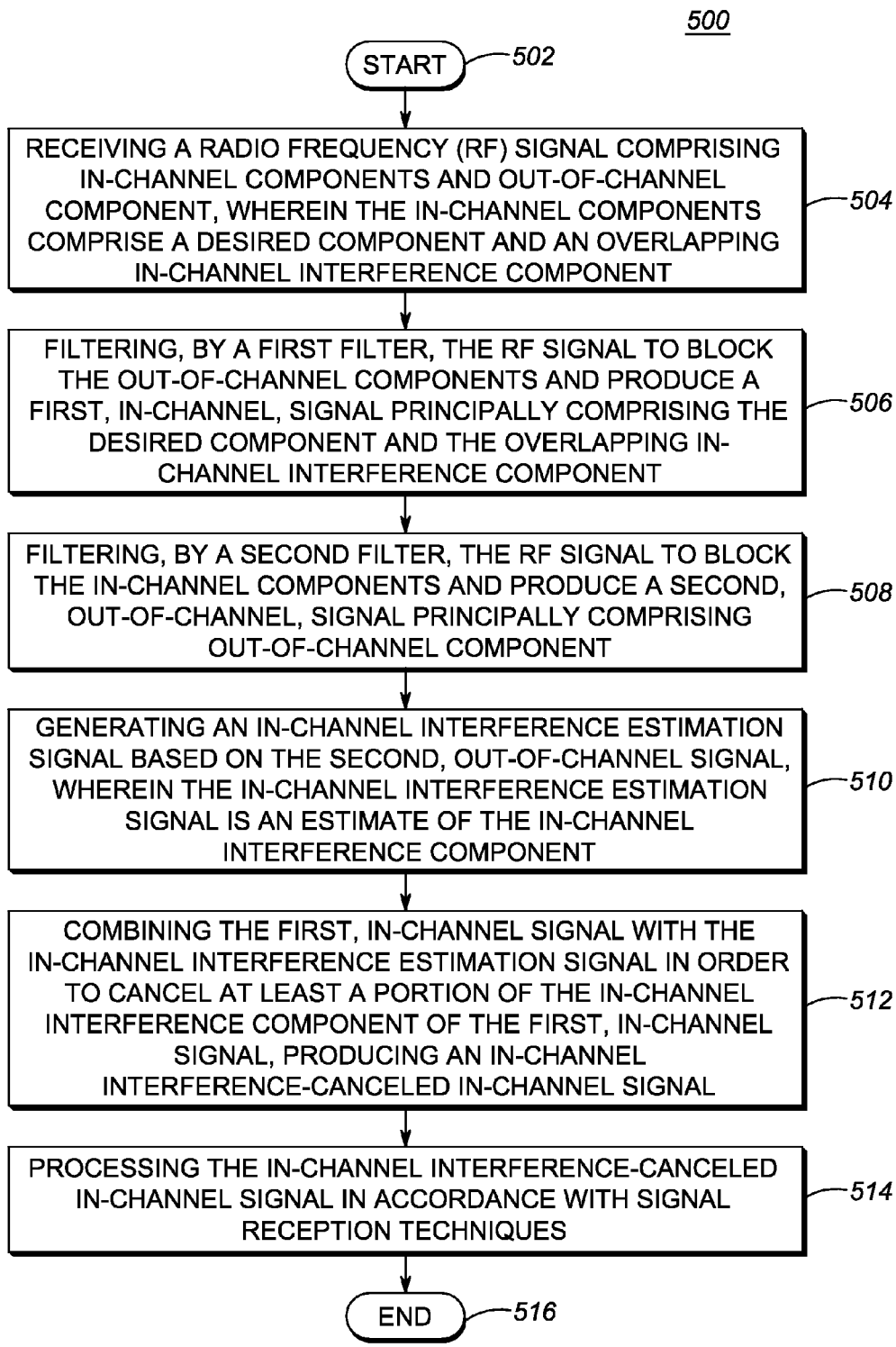
FIG. 5 is a logic flow diagram illustrating a method by which the wireless receiving communication device of FIG. 2 cancels in-channel interference in accordance with an embodiment of the present invention.

Referring now to FIGS. 4 and 5, an operation of receiving communication device 206 in canceling in-channel interference is depicted in accordance with various embodiments of the present invention. Referring first to FIG. 4, an architecture of receiver 306 of receiving communication device 206 is depicted in accordance with an embodiment of the present invention. As depicted in FIG. 4, receiver 306 comprises multiple filters 404, 410 (two shown). A first, 'in-channel' filter 404 of the multiple filters 404, 410 is coupled to a signal combiner 408, and a second, 'out-of-channel' filter 410 of the multiple filters 404, 410 is coupled to an in-channel interference estimator 414 that, in turn, is coupled to signal combiner 408. For example, receiver 306 may include several sub-receivers, or arms, that each is associated with a different filter of the multiple filters 404, 410 and that is tuned to receive a signal at a different frequency than the other arms.

Referring now to FIG. 5, a logic flow diagram 500 is provided that illustrates a method by which receiver 306 cancels in-channel interference in accordance with an embodiment of the present invention. Logic flow diagram 500 beings (502) when receiver 306 receives (504) a wireless, radio frequency (RF) signal 402 comprising 'in-channel' components and an 'out-of-channel' component, wherein the in-channel components include a desired signal component and an in-channel interference component and wherein 'in-channel' refers to the frequency channel allocated for the transmission of the desired signal and 'out-of-channel' refers to frequencies outside of the allocated channel. Receiver 306 then routes at least a sample of the received RF signal 402 to each of the multiple filters 404, 410 (two shown), for example, by use of a signal splitter (not shown) or by use of one or more signal sampling devices such as a directional couplers (not shown).

A first, in-channel filter 404 of the multiple filters 404, 410 performs a first filtering (506) of RF signal 402, that is, of the at least a sample of the RF signal routed to the filter, by blocking at least a portion of the out-of-channel components and passing the in-channel components of RF signals 402 to produce a first, 'in-channel' signal 406 principally comprising the desired signal component and the in-channel interference component. In-channel filter 404 then routes in-channel signal 406 to signal combiner 408. A second filter 410 of the multiple filters 404, 410 performs a second filtering (508) of RF signal 402, that is, of the at least a sample of the RF signal routed to the filter, by blocking at least a portion of the in-channel components and passing the out-of-channel component of RF signal 402 to produce a second, 'out-of-channel' signal 412 that principally comprises the out-of-channel component. Second filter 410 then routes out-of-channel signal 412 to in-channel interference estimator 414.

Preferably, filters 404, 410 are bandpass filters (BPFs) that, in one such embodiment, have passband of approximately a same bandwidth. For example, each of filters 404, 410 may have a 12.5 KHz (kilohertz) bandwidth when the in-channel signal is a Public Safety Narrowband (PSNB) signal. In one embodiment of the present invention, in-channel filter 404 is tuned to, that is, is centered at, a center frequency $f_d$ of a desired channel, that is, a channel allocated for the transmission of the desired (for example, narrowband) signal. For the purpose of illustrating the principles of the present invention, assume that in addition to the desired signal, the desired channel includes in-channel interference from sidelobe leakage from a physically nearby signal, for example, a multicarrier signal, transmitted at a frequency outside of the channel allocated for the desired signal, for example, 6 MHz away. Out-of-channel filter 410 is tuned to, that is, is centered at, a center frequency $f_1$ of a sidelobe of the nearby signal to pick up a portion, for example, a sidelobe, of the sideband interference similar to the in-channel interference falling in the desired channel.

In other embodiments of the present invention, each of the multiple filters 404, 410 may have a same passband, for example, may be a filter whose passband is centered at an intermediate frequency (IF) $f_{IF}$ or at baseband. Each such filter 404, 410 then may be preceded by a respective mixer 403, 409 that mixes the signal coming into that filter with a different frequency signal so as to adjust a frequency of a component of RF signal 402 to the filter's passband. For example, in an 'intermediate frequency' (IF) embodiment, a first mixer 403 may mix an incoming signal (RF signal 402) with a first reference signal, such as a signal of frequency '$f_d$-$f_{IF}$,' to produce a first mixed signal, thereby moving the desired signal, at frequency $f_d$, to a passband centered at $f_{IF}$ of filter 404. Similarly, a second mixer 409 may mix an incoming signal (RF signal 402) with a second reference signal, such as a signal of frequency '$f_1$-$f_{IF}$,' to produce a second mixed signal, thereby moving the out-of-channel component, at frequency $f_1$, to a passband centered at $f_{IF}$ of filter 410. By way of another example, in a 'baseband' embodiment, the first reference signal may be of frequency '$f_d$,' the second reference signal may be of frequency '$f_1$,' and filters 404 and 410 each may be a baseband filter, with the result that the first mixed signal comprises a baseband version of the desired signal that then is routed to baseband filter 404, and the second mixed signal and comprises a baseband version of the out-of-channel component that then is routed to baseband filter 410.

Referring again to FIG. 5, in-channel interference estimator 414 receives out-of-channel signal 412 and, based on the out-of-channel signal, generates (510) an in-channel interference estimation signal 416 that is an estimate of the in-channel interference component. For example, the out-of-channel component may be a sidelobe of a nearby, out-of-channel, non-desired signal that may be assumed to be an approximation of a sidelobe of the nearby signal falling within the desired channel. Thus, by filtering the out-of-channel sidelobe and providing the filtered out-of-channel sidelobe to in-channel interference estimator 414, the in-channel interference estimator may generate an in-channel version of the out-of-channel sidelobe.

Figure 6:
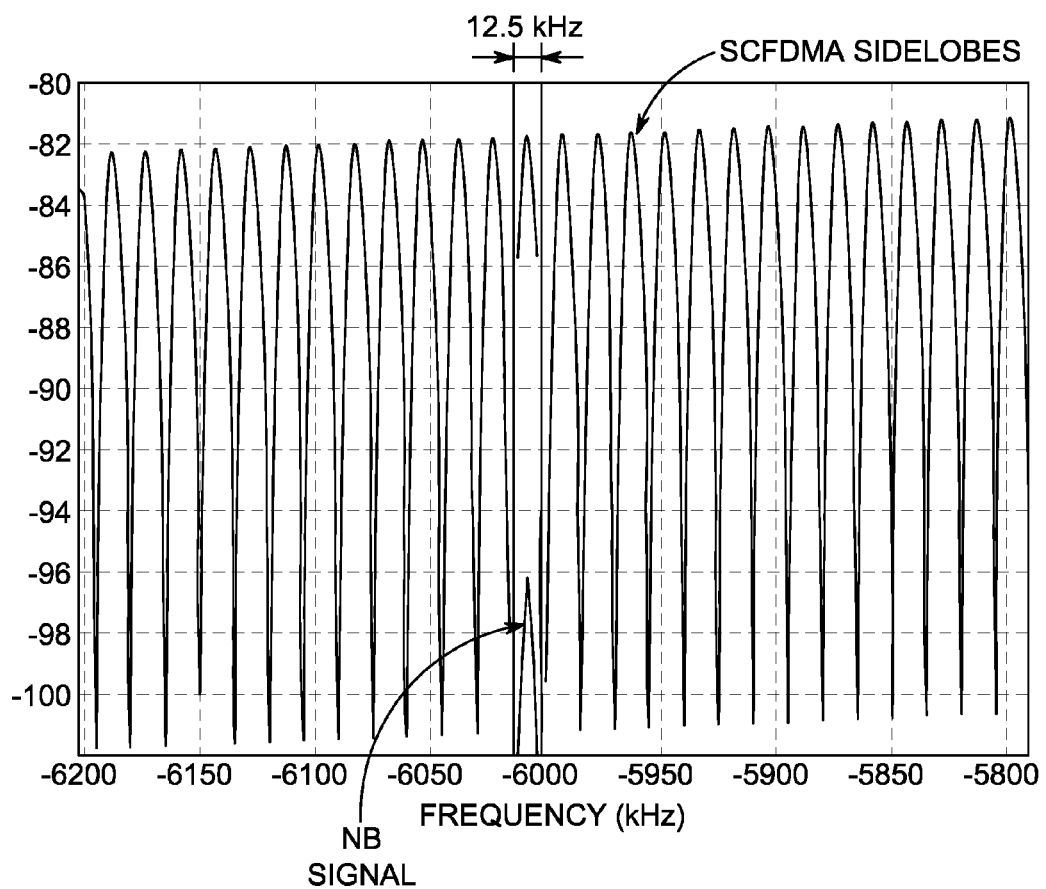
FIG. 6 is an exemplary spectral graph depicting a narrowband signal whose frequency band is overlapped by sidelobes of a nearby broadband signal.

For example, and merely for the purpose of illustrating the principles of the present invention and not intending to limit the invention in any way, FIG. 6 is a spectral graph illustrating an RF signal comprising a desired narrowband (NB) signal occurring in a desired narrowband channel and a nearby broadband SCFDMA (Single Carrier Frequency Division Multiple Access) signal having multiple sidelobes, including a sidelobe falling in the narrowband channel (that is, an in-channel interference component). Due to the high degree of similarity between sidelobes of the broadband signal, the interfering sidelobe that falls on the desired narrowband channel can be estimated and cancelled based on observations of other sidelobes that are not on the affected narrowband channel.

In-channel interference estimator 414 then routes in-channel interference estimation signal 416 to signal combiner 408. Signal combiner 408 combines (512) the in-channel signal 406 received from in-channel filter 404 and the in-channel interference estimation signal 416 received from in-channel interference estimator 414, preferably subtracting the latter from the former, in order to cancel at least a portion of the in-channel interference component of in-channel signal 406, producing an in-channel-interference-canceled in-channel signal 418 that principally is comprised of the desired signal. In-channel-interference-canceled in-channel signal 418 then is processed (514) by receiving communication device 206 in accordance with well-known signal reception and processing techniques, for example, to decode any information, such as traffic or control signaling, included in the desired signal, and logic flow 500 then ends (514).

In one embodiment of the present invention, in-channel interference estimator 414 may generate in-channel interference estimation signal 416 by generating an in-channel copy of out-of-channel signal 412 produced by filter 410. For example, in-channel interference estimator 414 may shift a center frequency of out-of-channel signal 412 to a center frequency of in-channel signal 406 and, optionally, phase rotate and gain adjust the frequency shifted out-of-channel signal in order to attempt to match a signal strength and phase of the in-channel interference included in in-channel signal 406. That is, receiving communication device 206 may assume that in-channel interference included in RF signals 402 is correlated with the out-of-channel component produced by second, out-of-channel filter 410. By frequency shifting the out-of-channel component, receiving communication device 206 can produce an in-channel signal that is spectrally similar to the in-channel interference. However, due to the sampling process, a sample of RF signals 402 routed to out-of-channel filter 410 may be of a lower signal strength than the sample of RF signals 402 routed to in-channel filter 404, so in-channel interference estimator 414 also may adjust a gain and phase of in-channel interference estimation signal 416 to compensate for the difference in sampled signal strengths and phases.

While only one out-of-channel filter 410 is depicted in FIG. 4, in other embodiments of the present invention, receiving communication device 206 may comprise one or more other out-of-channel filters in parallel with filters 404 and 410, which one or more other out-of-channel filters each has a passband centered at a different out-of-channel frequency $f_2, \ldots, f_n$ than the other filters. The other out-of-channel filters collect other, comparable out-of-channel signals, or sidelobes, associated with the nearby signal in order to improve an estimation of in-channel interference based on out-of-channel signals. For example, and again referring to FIG. 6, the depicted spectrum is centered at a center frequency of a 12.5 KHz narrowband (NB) signal of interest and includes sidelobes generated by a nearby, non-desired broadband SCFDMA signal. Each of the one or more out-of-channel filters then could be centered at a frequency of one of the sidelobes outside of the channel of the NB signal and would principally pick out, that is, pass, only that sidelobe. In such an embodiment, in-channel interference estimator 414 may generate in-channel interference estimation signal 416 by combining the out-of-channel signals, for example, the sidelobes passed by each such filter. For example, in-channel interference estimator 414 may generate in-channel interference estimation signal 416 by combining a weighted version of each such out-of-channel signal, or sidelobe, which weights are based on an estimate of how closely each such signal or sidelobe resembles the in-channel interference, or sidelobe. For example, in-channel interference estimator 414 may assume that the closer a sidelobe to the in-channel signal, the more closely the sidelobe resembles the in-channel sidelobe, and that the closer a sidelobe is to the out-of-channel signal generating that sidelobe, the greater the signal strength of that sidelobe relative to more distant sidelobes.

Figure 7:
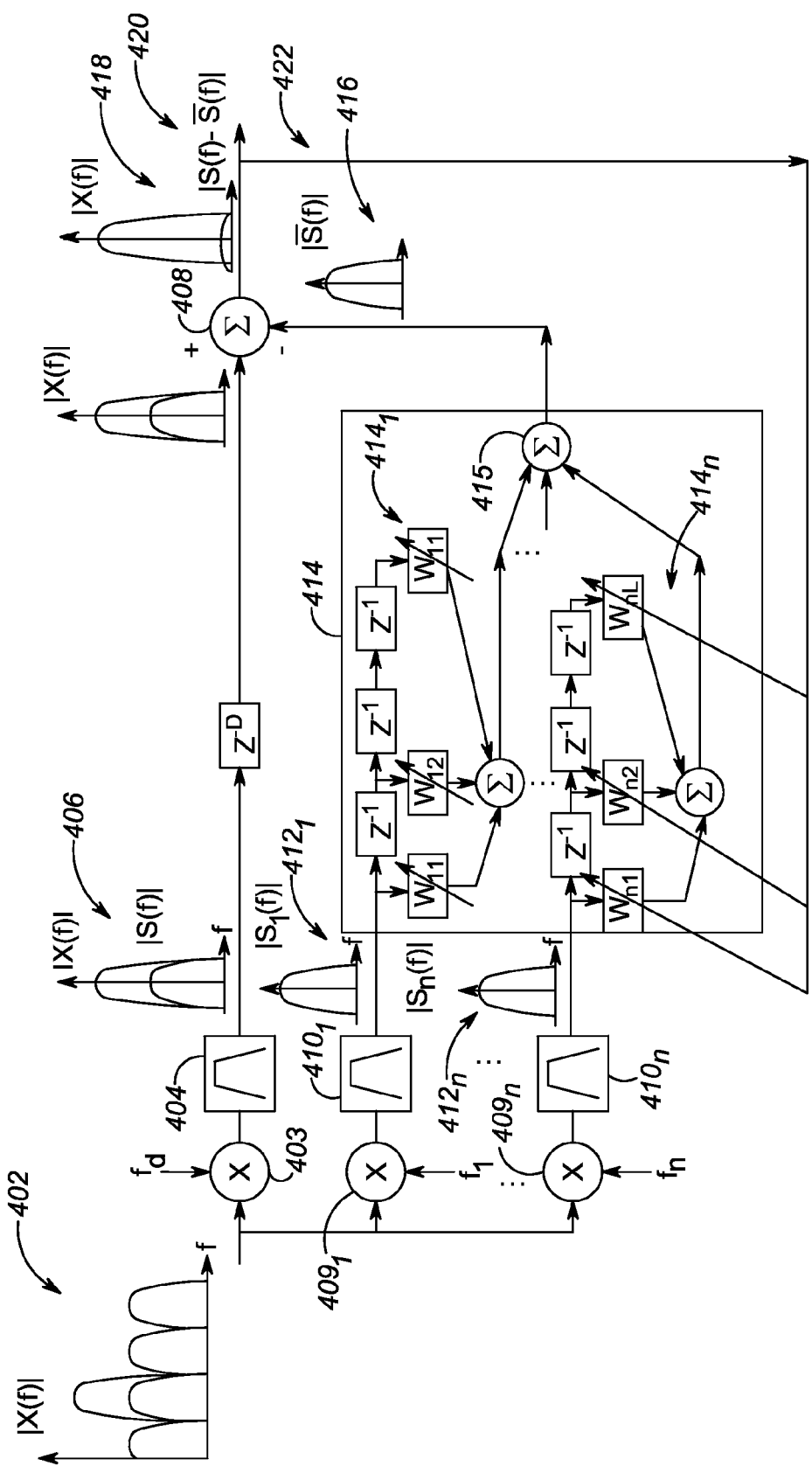
FIG. 7 depicts an architecture of the receiver of the wireless receiving communication device of FIG. 2 in accordance with another embodiment of the present invention.

In the various embodiments of the present invention, one or more of components 403, 404, 408, 409, 410, and 412 of receiver 306 may be implemented in hardware, or may be implemented in software maintained by at least one memory device 304 and executed by processor 302 of receiving communication device 206. For example and referring now to FIG. 7, in another, digital, embodiment of the present invention, in-channel interference estimator 414 may be implemented by processor 302 based on instructions maintained by at least one memory device 304. As depicted in FIG. 7, RF input signal 402 comprises an in-channel desired signal or component X(f), such as the narrowband signal depicted in FIG. 6, an in-channel interference component S(f), and multiple out-of-channel components $s_1(f), \ldots, s_n(f)$, such as the sidelobes depicted in FIG. 6. RF input signal 402 is routed to in-channel mixer 403, which mixes the signal with a first reference signal of frequency '$f_d$' to produce a first baseband signal that is routed to a baseband version of in-channel filter 404. In channel filter 404 filters out, or blocks, out-of-channel components of RF signal 402 and passes the in-channel components of the RF signal, to produce in-channel signal 406 principally comprising the desired in-channel components X(f) of RF signal 402 and in-channel interference component S(f). RF input signal 402 also is routed to each of one or more out-of-channel mixers $409_1, \ldots, 409_n$, which each mixes the signal with a corresponding reference signal of frequency $f_1$-$f_n$ to convert the signal to multiple baseband signals that then are routed to corresponding out-of-channel baseband bandpass filters $410_1$-$410_n$. Each out-of-channel filter $410_1$-$410_n$ filters out, or blocks, the out-of-channel components, or sidelobes, other than those originally centered at the filter's corresponding frequency $f_1$-$f_n$ to produce a corresponding out-of-channel component, or sidelobe, $s_1(f)$-$s_n(f)$ ($412_1$-$412_n$) that then is routed to in-channel interference estimator 414.

Still referring to FIG. 7, in-channel interference estimator 414 comprises one or more interference estimation modules $414_1$-$414_n$ that each generates a baseband interference component estimate based on the corresponding out-of-channel component, or sidelobe, $s_1(f)$-$s_n(f)$ ($412_1$-$412_n$) routed to the module. For example, as depicted in FIG. 7, each of the one or more interference estimation modules $414_1$-$414_n$ may comprise a Wiener filter. When in-channel interference estimator 414 includes multiple interference estimation modules, the interference component estimate generated by each of the multiple interference estimation modules $414_1$-$414_n$ then may be routed to an interference component combiner module 415 that combines the interference components estimates to produce in-channel interference estimation signal 416. In-channel interference estimation signal 416 then is routed to signal combiner 408.

In-channel interference estimator 414 may, in implementing each interference estimation module $414_1$-$414_n$, employ a non-linear prediction filter that includes both a feedforward and a feedback design. More particularly, receiver 306 may include a feedback circuit 422 that determines, and feeds back to each interference estimation module $414_1$-$414_n$, an error signal 420 corresponding to an error in the estimation of the in-channel interference, that is, corresponding to a difference between the in-channel interference component of in-channel signal 406 and in-channel interference estimation signal 416. Each interference estimation module $414_1$-$414_n$ then uses error signal 420 to adjust weights ('w') utilized by that module to produce the interference component estimate in order to optimize the cancellation of the in-channel interference component of in-channel signal 406 by signal combiner 408. For example, as depicted in FIG. 7, interference estimation module $414_1$ employs weights $w_{11}$-$w_{1L}$, and interference estimation module $414_n$ employs weights $w_{n1}$-$w_{nL}$, where L is the number of weights used by each module to generate a baseband interference component estimate. These weights then may be adjusted by in-channel interference estimator 414 based on error signal 420.

Simulations and mathematical models show that out-of-channel sidelobes so measured can provide an accurate estimate of a corresponding in-channel sidelobe, thereby providing for effective cancellation of the in-channel sidelobe. That is, a derivation of the regularity of the shape of the sidelobes, and a measure of similarity between different sidelobes, is as follows. Assume a time domain signal x(t) has a limited bandwidth. Assume signal x(t) can be expressed in Fourier series format as:

$$x(t) = \sum_{p=-N_2}^{N_2} a_p \cdot e^{j\frac{2\pi}{T}pt} \tag{1}$$

Where $N_1$ and $N_2$ are two integers, 1/T is a resolution is spectrum domain (a bin size in spectrum domain), and $\alpha_p$ are the Fourier series coefficients of x(t) which can be either real numbers or complex numbers. For simplicity and without losing generality, assume $N_1=0$ and $N_2=N-1$, where N is a number of bins in the spectrum domain.

In a real communication system, a time domain signal cannot be infinite long. Therefore, signal x(t) is windowed in time domain:

$$s(t) = x(t) \cdot rect(0, T) = \sum_{p=0}^{N-1} a_p \cdot e^{j\frac{2\pi}{T}pt} \cdot rect(0, T), \tag{2}$$

where s(t) is the transmitted signal, rect(0,T) is a rectangle function with time duration of T.

As is known, the spectrum of a rectangular function is a sin c( ) function. Now assume that the system is a linear time-invariant system. The spectrum of the transmitted signal s(t) can be modeled with sin c( ) functions as:

$$S(f) = \sum_{p=0}^{N-1} a_p \cdot \left( \frac{\sin(\pi \cdot (Tf - p))}{\pi \cdot (Tf - p)} \cdot e^{-j\pi \cdot (Tf-p)} \right) \tag{3}$$

To normalize the spectrum with 1/T, let $f=f_1/T$ and substitute f into equation (3):

$$S(f_1) = \sum_{p=0}^{N-1} a_p \cdot \left( \frac{\sin(\pi \cdot (f_1 - p))}{\pi \cdot (f_1 - p)} \cdot e^{-j\pi \cdot (f_1-p)} \right) \tag{4}$$

For simplicity, $f_1$ can be further defined as $f_1 = k+\delta$; where $-\infty < k < \infty$, k is an integer number and $0 \leq \delta < 1$ (5).

Substituting $f_1$ into the equation (4)

$$S_k(\delta) = \sum_{p=0}^{N-1} a_p \cdot \left( \frac{\sin(\pi \cdot (k - p + \delta))}{\pi \cdot (k - p + \delta)} \cdot e^{-j\pi \cdot (k-p+\delta)} \right). \tag{6}$$

It is known that $\sin(\pi \cdot (k-p+\delta)) = (-1)^{k-p} \cdot \sin(\delta \cdot \pi)$, and $\exp(j\pi(k-p+\delta)) = (-1)^{k-p} \cdot \exp(-j\delta\pi)$.

Then equation (6) can be simplified as $$S_k(\delta) = \sum_{p=0}^{N-1} a_p \cdot \left( \frac{\sin(\pi \cdot \delta)}{\pi \cdot (k - p + \delta)} \cdot e^{-j\pi \cdot \delta} \right). \tag{7}$$

After pulling out the common factors, equation (7) can be simplified as $$S_k(\delta) = \left( \sum_{p=0}^{N-1} \frac{a_p}{k - p + \delta} \right) \left( \frac{\sin(\pi \cdot \delta)}{\pi} \cdot e^{-j\pi \cdot \delta} \right). \tag{8}$$

One then may note that, in equation (8), the first term of is different for different integer number k (or for different sidelobe index) and the second terms is a common factor for all sidelobes. Further, for any fixed integer number k>N or k<0, the fractional variable δ changes from 0 to 1 represent a period of one sidelobe.

If one only is interested in a sidelobe k that is far away from the main lobe, then a reasonable assumption is that $$k - p \gg 1 \tag{9}$$

Substituting the assumption of equation (9) into equation (8) results in $$S_k(\delta) \cong \left( \sum_{p=0}^{N-1} \frac{a_p}{k - p} \right) \left( \frac{\sin(\pi \cdot \delta)}{\pi} \cdot e^{-j\pi \cdot \delta} \right) \tag{10}$$

The spectrum difference between side-lobe k and side-lobe k+1 then is $$S_k(\delta) - S_{k+1}(\delta) = \left( \sum_{p=0}^{N-1} \frac{a_p}{(k - p) \cdot (k + 1 - p)} \right) \left( \frac{\sin(\pi \cdot \delta)}{\pi} \cdot e^{-j\pi \cdot \delta} \right) \cong \tag{11}$$

$$\left( \sum_{p=0}^{N-1} \frac{a_p}{(k - p)^2} \right) \left( \frac{\sin(\pi \cdot \delta)}{\pi} \cdot e^{-j\pi \cdot \delta} \right)$$

where $0 \leq \delta < 1$. It can be seen from equation (11) that for the sidelobes that are far away from the main lobe, a difference between sidelobe k and sidelobe k+1 is a factor of $(k-N)^{-2}$. For any number k that satisfies the assumption of equation (9), the difference can be negligible. Simulations then have shown that, in accordance with theoretical estimations, the difference between adjacent sidelobes is about 38 dB (decibels) down from the original sidelobe, and that this difference can be further reduced by normalizing the signal of the adjacent sidelobe.

To see the time domain signal of the sidelobe k, first shift the sidelobe by 0.5 to baseband, then take an inverse Fourier transform of $S_k(\delta)$, $$s_k(t) = \int_{-0.5}^{0.5} S_k(\delta+0.5) \cdot e^{j2\pi t\delta} \cdot d\delta \tag{13}$$

Plugging equation (10) into equation (13) yields, after some manipulation, $$s_k(t) = \frac{j}{2 \cdot \pi^2} \cdot \left( \sum_{p=0}^{N-1} \frac{a_p}{k-p} \right) \cdot \frac{\sin(\pi \cdot \delta)}{t \cdot (t-1)}, \quad -\infty < t < \infty \quad (14)$$

where t is the time normalized with T.

The difference between two adjacent sidelobes in time domain is $$s_k(t) - s_{k+1}(t) = \frac{j}{2 \cdot \pi^2} \cdot \left( \sum_{p=0}^{N-1} \frac{a_p}{(k-p)(k+1-p)} \right) \cdot \frac{\sin(\pi t)}{t \cdot (t-1)} \cong \quad (15)$$

$$\frac{j}{2 \cdot \pi^2} \cdot \left( \sum_{p=0}^{N-1} \frac{a_p}{(k-p)^2} \right) \cdot \frac{\sin(\pi t)}{t \cdot (t-1)}$$

Again, it can be seen from equation (15) that for the sidelobes that are far away from the main lobe, the difference between sidelobe k and sidelobe k+1 in the time-domain is a factor of $(k-N)^{-2}$. For any number k that satisfies the assumption of equation (9), the difference can be negligible.

For example, with respect to an OFDM (Orthogonal Frequency Multiple Access) system, for a OFDM system with Q (Q≤1) symbols, mathematically the time domain signal of sidelobe k can be expressed as $$s_k(t) = \sum_{q=0}^{Q-1} \exp^{-j2\pi(k+0.5)q} \cdot s_k^{(q)}(t-q) = \sum_{q=0}^{Q-1} (-1)^q \cdot s_k^{(q)}(t-q) \quad (16)$$

where q is the symbol index, $0 \leq q \leq Q-1 \cdot s_k^{(q)}$ is the time domain signal of sidelobe k for symbol q as described in equation (14).

Substituting equation (14) into equation (16) results in the following equation for sidelobe k $$s_k(t) = \frac{j}{2 \cdot \pi^2} \cdot \sum_{q=0}^{Q-1} (-1)^q \cdot \left[ \left( \sum_{p=0}^{N-1} \frac{a_p^{(q)}}{k-p} \right) \cdot \frac{\sin(\pi(t-q))}{(t-q) \cdot ((t-q)-1)} \right] = \quad (17)$$

$$\frac{j}{2 \cdot \pi^2} \cdot \left( \sum_{q=0}^{Q-1} \frac{\sum_{p=0}^{N-1} \frac{a_p^{(q)}}{k-p}}{(t-q) \cdot ((t-q)-1)} \right) \cdot \sin(\pi t)$$

where $\alpha_p^{(q)}$ is the OFDM modulated signal value of subcarrier p (0≤p≤N−1) of symbol q(0≤q≤Q−1), k is the interested side-lobe index number (abs(k−N)>>1), and t is the normalized time with symbol duration T. Simulations then have shown that, in accordance with theoretical estimations, the difference between adjacent sidelobes is about 38 dB (decibels) down from the original sidelobe.

In the foregoing specification, specific embodiments have been described. However, one of ordinary skill in the art appreciates that various modifications and changes can be made without departing from the scope of the invention as set forth in the claims below. For example, while filters 404 and 410 have been described above as bandpass filters, any filter or series of filters may be used herein that will produce a first, 'in-channel' signal and a second, 'out-of-channel' signal from a received one or more RF signals, wherein the second, out-of-channel signal has approximately a same bandwidth as the first, in-channel signal, may be used herein. For example, in other embodiments, first filter 404 may be a low pass filter that blocks higher frequency (higher that the frequency of the in-channel signal) signals and passes the in-channel signal and second one or more filters 410 may comprise one or more high pass filters that pass such higher frequency (higher that the frequency of the in-channel signal) signals and blocks in-channel signals. By way of another example, first filter 404 may be a high pass filter that blocks lower frequency (lower that the frequency of the in-channel signal) signals and passes the in-channel signal and second one or more filters 410 may comprise one or more low pass filters that pass such lower frequency (lower that the frequency of the in-channel signal) signals and blocks in-channel signals. The specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for canceling in-channel interference comprising:
   receiving a wireless signal comprising in-channel components and an out-of-channel component, wherein the in-channel components comprise a desired component and an in-channel interference component;
   mixing the wireless signal with a first reference signal to produce a first mixed signal;
   mixing the wireless signal with a second reference signal to produce a second mixed signal;
   performing a first filtering of the first mixed signal that blocks at least a portion of the out-of-channel component to produce a first signal comprising the in-channel components;
   performing a second filtering of the second mixed signal that blocks at least a portion of the in-channel components to produce a second signal comprising the out-of-channel component;
   generating an in-channel interference estimation signal based on the second signal; and
   combining the first signal and the in-channel interference estimation signal to at least partially cancel the in-channel interference component of the first signal.

2. The method of claim 1, wherein mixing the wireless signal with the first reference signal produces the first mixed signal at an intermediate frequency and wherein mixing the wireless signal with the second reference signal produces the second mixed signal at the intermediate frequency.

3. The method of claim 1, wherein mixing the wireless signal with the first reference signal produces the first mixed signal at a baseband frequency and wherein mixing the wireless signal with a second reference signal produces the second mixed signal at the baseband frequency.

4. The method of claim 1, wherein each of performing a first filtering of the wireless signal and performing a second filtering of the wireless signal comprises filtering the wireless signal with a Wiener filter.

5. A method for canceling in-channel interference comprising:
   receiving a wireless signal comprising in-channel components and an out-of-channel component, wherein the in-channel components comprise a desired component and an in-channel interference component;
   performing a first filtering of the wireless signal that blocks at least a portion of the out-of-channel component to produce a first signal comprising the in-channel components;
   performing a second filtering of the wireless signal that blocks at least a portion of the in-channel components to produce a second signal comprising the out-of-channel component, wherein the second signal comprises an out-of-channel sidelobe of a non-desired out-of-channel signal;
   generating an in-channel interference estimation signal based on the second signal; and
   combining the first signal and the in-channel interference estimation signal to at least partially cancel the in-channel interference component of the first signal.

6. The method of claim 5, wherein generating an in-channel interference estimation signal based on the second signal comprises generating an in-channel version of the out-of-channel sidelobe and wherein the in-channel interference component of the first signal comprises an in-channel sidelobe of the non-desired out-of channel signal.

7. A method for canceling in-channel interference comprising:
   receiving a wireless signal comprising in-channel components and an out-of-channel component, wherein the in-channel components comprise a desired component and an in-channel interference component;
   performing a first filtering of the wireless signal that blocks at least a portion of the out-of-channel component to produce a first signal comprising the in-channel components;
   performing a second filtering of the wireless signal that blocks at least a portion of the in-channel components to produce a second signal comprising the out-of-channel component, wherein performing a second filtering of the wireless signal that blocks at least a portion of the in-channel components to produce a second signal comprising the out-of-channel component comprises performing a plurality of filterings of the wireless signal to produce a plurality of out-of-channel components;
   generating an in-channel interference estimation signal based on the plurality of out-of-channel components; and
   combining the first signal and the in-channel interference estimation signal to at least partially cancel the in-channel interference component of the first signal.

8. The method of claim 7, wherein generating an in-channel interference estimation signal based on the second signal comprises:
   weighting each out-of-channel component of the plurality of out-of-channel components to produce a plurality of weighted out-of-channel components; and
   combining the plurality of weighted out-of-channel components.

9. The method of claim 8, wherein combining the first signal and the in-channel interference estimation signal comprises combining the first signal and the in-channel interference estimation signal to at least partially cancel the in-channel interference component of the first signal and produce an in-channel-interference-canceled in-channel signal and wherein the method further comprises:
   determining an error signal based on the in-channel-interference-canceled in-channel signal; and
   adjusting the weightings of the plurality of out-of-channel components based on the error signal.

10. A receiver comprising:
   an antenna for receiving a wireless signal comprising in-channel components and an out-of-channel component, wherein the in-channel components comprise a desired component and an in-channel interference component;
   a first mixer that mixes the wireless signal with a first reference signal to produce a first mixed signal;
   a second mixer that mixes the wireless signal with a second reference signal to produce a second mixed signal;
   a first filter that filters the first mixed signal by blocking at least a portion of the out-of-channel component to produce a first signal comprising the in-channel components;
   at least a second filter that filters the second mixed signal by blocking at least a portion of the in-channel components to produce a second signal comprising the out-of-channel component;

an in-channel interference estimator that generates an in-channel interference estimation signal based on the second signal; and a combiner that combines the first signal and the in-channel interference estimation signal to at least partially cancel the in-channel interference component of the first signal.

11. The receiver of claim 10, wherein mixing the wireless signal with the first reference signal produces the first mixed signal at an intermediate frequency and wherein mixing the wireless signal with the second reference signal produces the second mixed signal at the intermediate frequency.

12. The receiver of claim 10, wherein mixing the wireless signal with the first reference signal produces the first mixed signal at a baseband frequency and wherein mixing the wireless signal with the second reference signal produces the second mixed signal at the baseband frequency.

13. The receiver of claim 10, wherein each of the first filter and the at least a second filter comprises a Wiener filter.

14. A receiver comprising:

an antenna for receiving a wireless signal comprising in-channel components and an out-of-channel component, wherein the in-channel components comprise a desired component and an in-channel interference component;

a first filter that filters the wireless signal by blocking at least a portion of the out-of-channel component to produce a first signal comprising the in-channel components;

at least a second filter that filters the wireless signal by blocking at least a portion of the in-channel components to produce a second signal comprising the out-of-channel component, wherein the second signal comprises an out-of-channel sidelobe of a non-desired out-of channel signal;

an in-channel interference estimator that generates an in-channel interference estimation signal based on the second signal; and a combiner that combines the first signal and the in-channel interference estimation signal to at least partially cancel the in-channel interference component of the first signal.

15. The receiver of claim 14, wherein the in-channel interference estimator generates an in-channel interference estimation signal based on the second signal by generating an in-channel version of the out-of-channel sidelobe and wherein the in-channel interference component of the first signal comprises an in-channel sidelobe of the non-desired out-of channel signal.

16. A receiver comprising:

an antenna for receiving a wireless signal comprising in-channel components and an out-of-channel component, wherein the in-channel components comprise a desired component and an in-channel interference component;

a first filter that filters the wireless signal by blocking at least a portion of the out-of-channel component to produce a first signal comprising the in-channel components;

at least a second filter that filters the wireless signal by blocking at least a portion of the in-channel components to produce a second signal comprising the out-of-channel component, wherein the at least a second filter comprises a plurality of filters, wherein each filter of the plurality of filters performs a filtering of the wireless signal to produce an out-of-channel component, and wherein the out-of-channel component produced by each filter of the plurality of filters is different than the out-of-channel component produced by the other filter of the plurality of filter;

an in-channel interference estimator that generates an in-channel interference estimation signal by combining the out-of-channel components produced by the plurality of filters; and a combiner that combines the first signal and the in-channel interference estimation signal to at least partially cancel the in-channel interference component of the first signal.

17. The receiver of claim 16, wherein the in-channel interference estimator generates an in-channel interference estimation signal generates an in-channel interference estimation signal based on the second signal by:

weighting the plurality of out-of-channel components to produce a plurality of weighted out-of-channel components; and combining the plurality of weighted out-of-channel components.

18. The receiver of claim 17, wherein combining, by the in-channel interference estimator, of the first signal and the in-channel interference estimation signal at least partially cancels the in-channel interference component of the first signal and produces an in-channel-interference-canceled in-channel signal, wherein receiver further comprises a feedback circuit that determines an error signal based on the in-channel-interference-canceled in-channel signal and routes the error signal to the in-channel interference estimator, and wherein the in-channel interference estimator adjusts the weightings of the plurality of out-of-channel components based on the error signal.

* * * * *